United States Patent [19]
Gerber

[11] Patent Number: 5,884,462
[45] Date of Patent: Mar. 23, 1999

[54] WHEELED SUPPORT FOR LAWN MAINTENANCE EQUIPMENT

[75] Inventor: Edward H. Gerber, Hudson, Fla.

[73] Assignee: Edward Henry Gerber, Hudson, Fla.

[21] Appl. No.: 626,154

[22] Filed: Apr. 4, 1996

[51] Int. Cl.⁶ ................................................. A01D 34/68
[52] U.S. Cl. .............................. 56/12.1; 56/12.7; 56/16.7
[58] Field of Search .................................. 56/12.1, 12.7, 56/16.7; 30/276

[56] References Cited

U.S. PATENT DOCUMENTS

| | | | |
|---|---|---|---|
| 4,182,100 | 1/1980 | Letter | 56/16.7 |
| 4,922,694 | 5/1990 | Emoto | 56/12.7 X |
| 4,936,886 | 6/1990 | Quillen | 56/16.7 |
| 5,613,354 | 3/1997 | Foster | 56/12.7 X |

Primary Examiner—Terry Lee Melius

[57] ABSTRACT

A wheeled support for controlled movement of lawn maintenance equipment. The wheeled support has a fixed upper support member and a telescoping lower support member each of which are attached to a main support so that the wheeled support is adaptable for supporting different types lawn maintenance equipment. A clamping device attached to the distal end of the telescoping lower support member and a strap-like member attached to the upper support member secure the piece of lawn maintenance equipment to the wheeled support during use. The wheeled support may have a remote throttle control, and may also have a muffler guard and an exhaust deflector. The wheeled support may be used with any electrical or gasoline-powered piece of equipment which is attached to a straight or bent shaft. Applications may include, but are not limited to, use with line trimmers, cultivators, brush cutters, edgers, blowers, and vacuums.

17 Claims, 2 Drawing Sheets

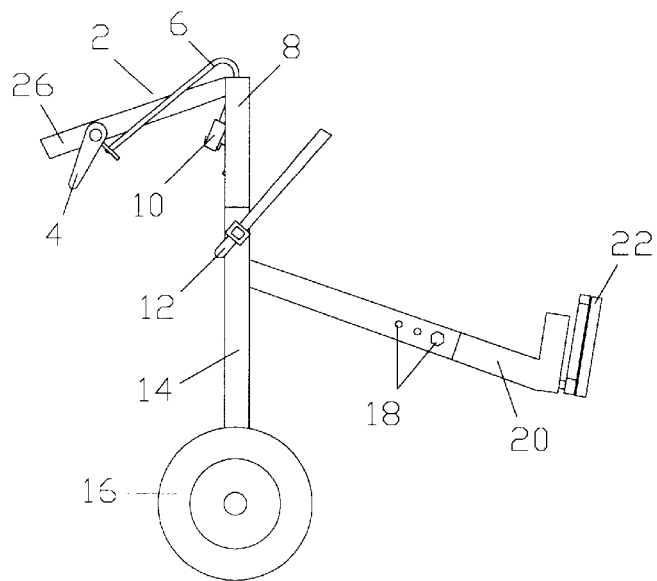

WHEELED SUPPORT FOR LAWN MAINTENANCE EQUIPMENT

BACKGROUND

1. Field of Invention

This invention relates to wheeled support assemblies, specifically to a wheeled support assembly for lawn maintenance equipment having a fixed upper support member and a telescoping lower support member so that the wheeled support assembly is adaptable for supporting different types of lawn maintenance equipment. Applications may include, but are not limited to, use in supporting line trimmers, cultivators, brush cutters, edgers, blowers, and vacuums.

BACKGROUND

2. Description of Prior Art

Many people find lawn maintenance designed for hand-use to be heavy and awkward to use. Also, people who are not conditioned for extended hand-use of such equipment, may find it tiring to use after a short period of time. Further, during extended use of some types of hand-held lawn maintenance equipment, equipment vibration may cause numbing of a user's hands and fingers. Also, many users are not skilled in the use of lawn maintenance equipment, particularly line trimmers and edgers, and they become frustrated when they cannot achieve uniform, professional-looking landscaping results during hand-held use of such equipment. As a result, in order to overcome these problems, wheeled supports have been developed for use with various types of lawn maintenance equipment.

U.S. Pat. No. 4,756,147 to Savell (1988) discloses a carriage for converting a line trimmer into a lawn mower. The Savell invention comprises a planar deck having wheels, a central opening for receiving the line trimmer housing, and a means of supporting the protective shield of the motor housing below the plane of the deck. The deck holds the cutting head of the line trimmer at a specified height above the ground. Although the Savell invention might help a line trimmer user to achieve more professional looking lawn cutting results, the Savell invention appears to be limited for use in converting a line trimmer into a wheeled lawn mowing device and not adaptable for use with other types of lawn maintenance equipment. The invention disclosed in U.S. Pat. No. 4,922,694 to Emoto (1990) discloses a two-wheeled support for a line trimmer which supports the shaft of a line trimmer instead of the protective shield of its motor housing as does the Savell invention. The Emoto invention has a support collar attached to a height adjustment assembly for attachment to the upper shaft of a line trimmer. The lower portion of the line trimmer shaft is supported by a brace assembly having a U-shaped support component connected to an adjustable sliding component which comprises a wing nut assembly slidably engaged with a slotted portion of a brace. The Emoto invention has no handle assembly and use of the Emoto invention is controlled by handles belonging to the supported line trimmer. A disadvantage of the Emoto invention is that its support collar limits its use to line trimmers and other types of elongated lawn maintenance equipment having a narrow shaft between a handle and a functional end. Thus, the Emoto invention would not be configured for support of a blower or a vacuum.

Another invention similar to the Emoto invention is disclosed in U.S. Pat. No. 4,704,849, Gilbert (1987). The Gilbert invention discloses a wheeled support which attaches to the shaft of a line trimmer and comprises a yoke pivotally mounted to two frame members to permit angular adjustment about a horizontal axis. The yoke also has two pivoting pieces to allow insertion and removal of a line trimmer handle. Similarly to the Emoto invention, the Gilbert invention is configured for support of a piece of lawn maintenance equipment having a narrow shaft and is not configured for support of blowers and vacuums. A further wheeled support for a line trimmer is disclosed in U.S. Pat. No. 5,095,687 to Andrew (1992). The Andrew invention discloses a single ground engaging wheel connected to a rod-like member which is attached by adjustable swivel brackets to a line trimmer shaft. The Andrew invention also is configured for support of a piece of lawn maintenance equipment having a narrow shaft and is not configured for support of blowers and vacuums. The invention in U.S. Pat. No. 5,408,816 to Cartier (1995) discloses a three-wheeled support for lawn maintenance equipment for damping some of the vibration generated by the motor of the supported piece of equipment. The Cartier invention comprises an elongated frame having a handle on one end and a fixed front wheel, or a front wheel mounted on a swiveling coupling, on its other end. An auxiliary wheel assembly is attached to the elongated frame between the handle and the front wheel. A rocking shaft holder is also attached to the elongated frame for support of the shaft of a piece of lawn maintenance equipment and damping of some of the vibration generated by its motor. The Cartier invention also is configured for support of a piece of lawn maintenance equipment having a narrow shaft and is not configured for support of blowers and vacuums. It is not known to have a wheeled support for lawn maintenance equipment having a fixed upper support member and a telescoping lower support member so that the wheeled support is adaptable for supporting different types of lawn maintenance equipment, including blowers and vacuums.

SUMMARY OF INVENTION—OBJECTS AND ADVANTAGES

It is the primary object of this invention to provide a support for lawn maintenance equipment designed for hand-held use. It is also an object of this invention to provide a support for lawn maintenance equipment which is adaptable for support of different types of lawn maintenance equipment, including line trimmers, cultivators, brush cutters, edgers, blowers, and vacuums. A further object of this invention is to provide a support for lawn maintenance equipment which allows a user to operate lawn maintenance equipment in a comfortable, upright position without having to bend over. It is also an object of this invention to provide a support for lawn maintenance equipment which is lightweight and easy to use so that an unskilled user may obtain longer use and more uniform, professional-looking landscaping results than would be possible with hand-held use of the same equipment. It is also an object of this invention to provide a support for lawn maintenance equipment which dampens some of the vibration caused by operation of such equipment to diminish or eliminate the numbing of a user's hands and fingers which may be result from hand-held use of the equipment.

As described herein, properly manufactured and attached to a piece of lawn maintenance equipment designed for hand-held use, the present invention would provide a support for the piece of hand-held lawn maintenance equipment which is lightweight and easy to use, allowing an unskilled user to obtain longer use and more uniform, professional-looking landscaping results than would be possible with hand-held use of the same equipment. A main vertical support having wheels attached to its lower end and handles attached to its upper end enhance controlled movement of the supported piece of lawn maintenance equipment during its use. A telescoping lower support member, a clamping device attached to the telescoping lower support member, an upper equipment support member attached to the main vertical support, and a strap-like device attached to the upper equipment support member give the present invention flexibility to support different types of lawn maintenance equipment, including line trimmers, cultivators, brush cutters, edgers, blowers, and vacuums. The use of the clamping device and the strap-loke device allow for secure attachment of a piece of lawn maintenance equipment to the wheeled support during use, and rapid release of the piece of lawn maintenance equipment from the wheeled support after use. A throttle clamp attached to the equipment throttle of the supported piece of lawn maintenance equipment, a remote throttle lever, and a throttle cable connected between the throttle clamp and the remote throttle lever would allow a user to operate the supported piece of lawn maintenance equipment in a comfortable, upright position without having to bend over. Also, vibration caused by operation of a supported piece of lawn maintenance equipment would be distributed over the entire frame of the wheeled support, causing less numbing of a user's hands and fingers than would result from hand-use of the same piece of lawn maintenance equipment.

The description herein provides preferred embodiments of the present invention but should not be construed as limiting the scope of the lawn maintenance equipment support invention. Variations in the type of strap-like device used, the type of fastening means to secure the telescoping lower support member into a fixed position, the number of wheels used, the type of wheels used, the shape of the handles, the shape of the throttle lever, and the configuration of the clamping device, other than those shown and described herein, may be incorporated into the present invention. Thus the scope of the present invention should be determined by the appended claims and their legal equivalents, rather than the examples given.

BRIEF DESCRIPTION OF THE DRAWINGS

FIG. 3 is a side view of the invention.

FIG. 4 is a front view of the invention having an open lower clamp.

FIG. 5 is a front view of the invention having a closed lower clamp.

DETAILED DESCRIPTION OF PREFERRED EMBODIMENTS

Figure 1:
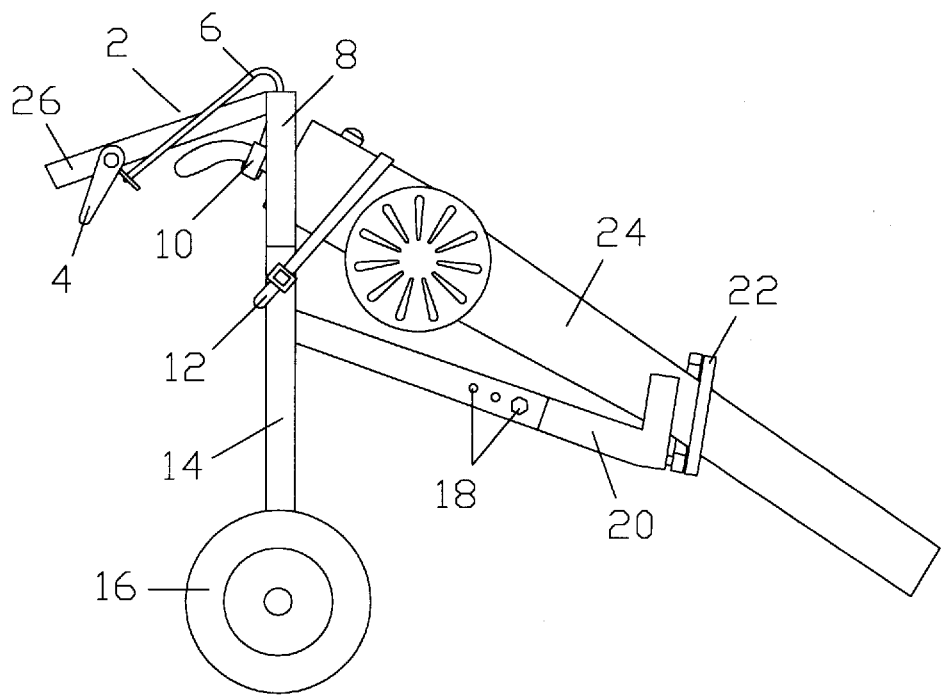
FIG. 1 is a side view of the invention attached to a blower.
Figure 2:
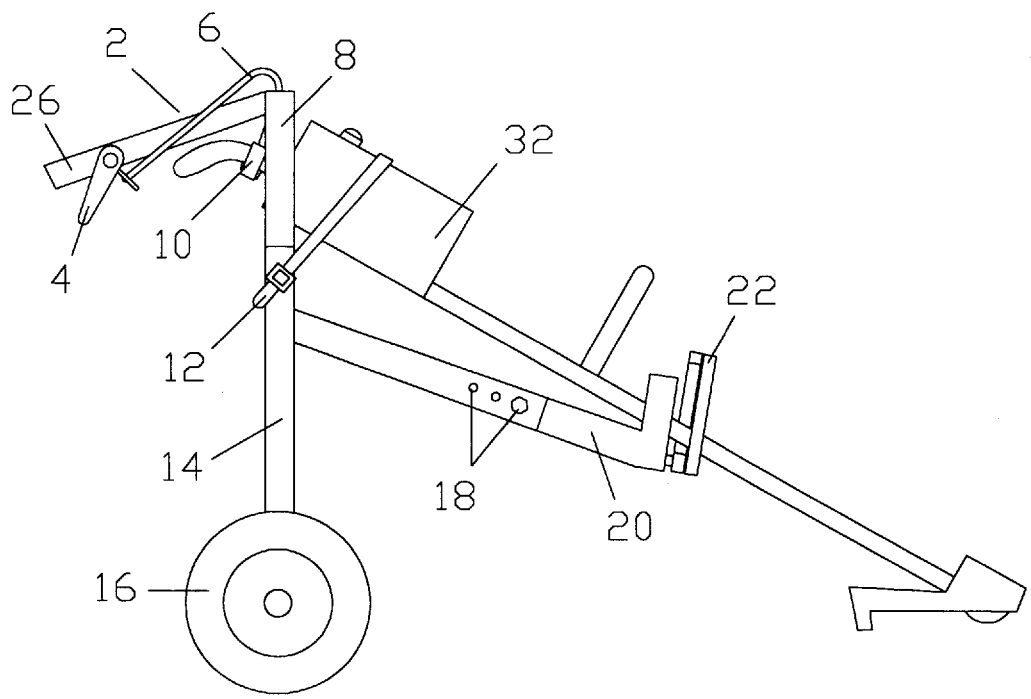
FIG. 2 is a side view of the invention attached to a line trimmer.

FIGS. 1, 2 and 3 show a preferred embodiment of a lawn maintenance equipment support 2. FIG. 1 shows lawn maintenance equipment support 2 in use supporting a blower 24, FIG. 2 shows lawn maintenance equipment support 2 in use supporting a line trimmer 32, while FIG. 3 shows lawn maintenance equipment support 2 in an unencumbered state. In FIGS. 1, 2, and 3 lawn maintenance equipment support 2 is shown to have a main support 14, an upper equipment support member 8 attached to the upper portion of main support 14, and a telescoping lower equipment support member 20 depending from the central portion of main support 14. FIGS. 1, 2, and 3 also show a buckled strap 12 attached to main support 14 for securing the upper portions of blower 24 and line trimmer 32 to upper equipment support member 8. A clamping device 22 attached to the distal end of telescoping lower equipment support member 20 secures the lower portions of blower 24 and line trimmer 32 to telescoping lower equipment support member 20. FIGS. 1, 2, and 3 also show lawn maintenance equipment support 2 having a handle 26, a throttle lever 4 attached to handle 26, a throttle clamp 10 attached to blower 24 and line trimmer 32, and a throttle cable 6 connected between throttle clamp 10 and throttle lever 4. In addition, FIGS. 1, 2, and 3 show a wheel 16 attached to the lower portion of main support 14 and holes 18 through the middle portion of telescoping lower equipment support member 20 for insertion therethrough of bolts (not shown) or pins (not shown) to secure telescoping lower equipment support member 20 into a fixed position and prevent it from extending or collapsing.

In the preferred embodiment, it is contemplated for main support 14, handle 26, telescoping lower equipment support member 20, and upper equipment support 8 to be made from lightweight materials, such as a durable plastic or a metallic material, such as aluminum. Although three holes 18 are shown in FIGS. 1, 2, and 3, the number of holes 18 through telescoping lower equipment support member 20 is not critical to lawn maintenance equipment support 2. Also, the material from which buckled strap 12 is made is not critical to lawn maintenance equipment support 2, as long as buckled strap 12 is made of a material strong enough to effectively secure blower 24 and line trimmer 32 to upper equipment support member 8. Further, although FIGS. 1, 2, and 3 show buckled strap 12 attached to upper equipment support member 8, the use of buckled strap 12 is not critical to lawn maintenance equipment support 2 and it is contemplated to have other means of securing blower 24 and line trimmer 32 to upper equipment support member 8.

In addition to the features shown in FIGS. 1, 2, and 3, FIGS. 4 and 5 show lawn maintenance equipment support 2 having two handles 26, two wheels 16, an axle 28 connected between wheels 16, clamping device 22 having two members which are each movable relative to the other so that clamping device 22 may move between opened and closed position, and a hinging device 34 movabling connecting the two members of clamping device 22. FIGS. 4 and 5 also show upper equipment support member 8 and clamping device 22, each having a U-shaped configuration for support of line trimmer 32 and blower 24. FIG. 4 shows clamping device 22 in an opened position, while FIG. 5 shows clamping device 22 in a closed position.

To use lawn maintenance equipment support 2, a user (not shown) would place clamping device 22 into an opened position and disconnect connecting portions of buckled strap 12 from each other. The user could then place a piece of lawn maintenance equipment, such as line trimmer 32 or blower 24, within the legs of the U-shaped configurations of upper equipment support member 8 and clamping device 22. Using pins (not shown) or bolts (not shown) in at least one hole 18, telescoping lower equipment support member 20 would be adjusted to allow clamping device 22 to support line trimmer 32 or blower 24 in an optimum position for effective use without extending or collapsing. Hinges 34 would allow clamp 22 to close around the lower portions of line trimmer 32 or blower 24 to secure it into the optimum position for use. After use, line trimmer 32 or blower 24 could be quickly removed from lawn maintenance equipment support 2 and converted to hand-held use by opening clamp 22 and disconnecting the connecting portions of buckled strap 12 from each other. It is contemplated for the wheeled support to be used with any electrical or gasoline-powered piece of lawn maintenance equipment which is attached to a straight or bent shaft. Also, although not shown, it is contemplated for lawn maintenance equipment support 2 to have a muffler guard and an exhaust deflector attached to either main support 14, upper equipment support member 8, or handle 26. Further, it is contemplated for lawn maintenance equipment support 2 to be used to individually support a variety of types of lawn maintenance equipment, including but are not limited to, line trimmers 32, cultivators (not shown), brush cutters (not shown), edgers (not shown), blowers 24, and vacuums (not shown).

What is claimed is:

1. A support for a piece of lawn maintenance equipment having an upper end and a lower end, said support comprising a main support having an upper portion, a central portion, and a lower portion; an upper equipment support member upwardly depending from said upper portion; at least one handle depending rearwardly from said upper equipment support member; at least one strap-like device attached to said upper equipment support member; at least one telescoping lower equipment support member depending in a forward direction from said central portion of said main support, each of said telescoping lower equipment support members having a middle portion and a distal end; securing means in said middle portion to prevent each of said telescoping lower equipment support members from extending or collapsing during use; a clamping device attached to each of said distal ends, each of said clamping devices capable of moving between opened and closed positions; and a plurality of wheels connected to said lower portion of said main support so that said piece of lawn maintenance equipment may be moved during operation in a controlled manner on said wheels by a user applying force to said handles while said upper end of said piece of lawn maintenance equipment is supported by said upper equipment support member and attached thereto by said at least one strap-like device, and said lower end of said piece of lawn maintenance equipment is supported by said clamping devices attached to said telescoping lower equipment support members which are fixed in positions to allow said clamping devices to close around and support said lower end during use.

2. The support of claim 1 further comprising a throttle lever attached to said handle, a throttle clamp attached to said piece of lawn maintenance equipment, and a throttle cable connected between said throttle lever and said throttle clamp so that a user may operate said piece of lawn maintenance equipment by movement of said throttle lever.

3. The support of claim 1 wherein said at least one strap-like device comprise at least one buckled strap.

4. The support of claim 1 further comprising a muffler guard and an exhaust deflector attached to said upper equipment support member.

5. The support of claim 1 wherein said upper equipment support member and said clamping devices are U-shaped.

6. The support of claim 1 wherein said telescoping lower equipment support member has an outer surface and said securing means comprises a plurality of holes through said outer surface, and further comprising a plurality of pins for engagement with said holes to prevent said telescoping lower equipment support member from extending or collapsing.

7. The support of claim 1 wherein said telescoping lower equipment support member has an outer surface and said securing means comprises a plurality of holes through said outer surface, and further comprising a plurality of bolts for engagement with said holes to prevent said telescoping lower equipment support member from extending or collapsing.

8. A support for a piece of lawn equipment having an upper end, a lower end, and an equipment throttle, said support comprising a main support having an upper portion, a central portion, and a lower portion; a U-shaped upper equipment support member upwardly depending from said upper portion; at least one handle depending rearwardly form said upper equipment support member; at least one strap-like device attached to said upper equipment support member; a throttle lever attached to said handle, a throttle clamp attached to said equipment throttle; a throttle cable connected between said throttle lever and said throttle clamp so that a user may remotely operate said equipment throttle by operation of said throttle lever; at least one telescoping lower equipment support member depending in a forward direction from said central portion, each of said telescoping lower equipment support members having a middle portion and a distal end; securing means in said middle portion to prevent each of said telescoping lower equipment support members from extending or collapsing during use; a U-shaped clamping device attached to each of said distal ends, each of said U-shaped clamping devices capable of moving between opened and closed positions; and a plurality of wheels connected to said lower portion of said main support so that said piece of lawn maintenance equipment may be moved during operation in a controlled manner on said wheels by a user applying force to said handles while said upper end of said piece of lawn maintenance equipment is supported by said U-shaped upper equipment support member and attached thereto by said at least one strap-like device, and said lower end of said piece of lawn maintenance equipment is supported by said clamping devices attached to said telescoping lower equipment support members which are fixed in position to allow said clamping devices to close around and support said lower end during use.

9. The support of claim 8 wherein said at least one strap-like device comprise at least one buckled strap.

10. The support of claim 8 further comprising a muffler guard and an exhaust deflector attached to said upper equipment support member.

11. The support of claim 8 wherein said telescoping lower equipment support member has an outer surface and said securing means comprises a plurality of holes through said outer surface, and further comprising a plurality of pins for engagement with said holes to prevent said telescoping lower equipment support member from extending or collapsing.

12. The support of claim 8 wherein said telescoping lower equipment support member has an outer surface and said securing means comprises a plurality of holes through said outer surface, and further comprising a plurality of bolts for engagement with said holes to prevent said telescoping lower equipment support member from extending or collapsing.

13. A support for a piece of lawn equipment having an upper end, a lower end, and an equipment throttle, said support comprising a main support having an upper portion, a central portion, and a lower portion, a U-shaped upper equipment support member upwardly depending from said upper portion; at least one handle depending rearwardly form said upper equipment support member; a strap-like device attached to said upper equipment support member; a throttle lever attached to said handle, a throttle clamp attached to said equipment throttle; a throttle cable connected between said throttle lever and said throttle clamp so that a user may remotely operate said equipment throttle by operation of said throttle lever; a telescoping lower equipment support member depending in a forward direction from said central portion, said telescoping lower equipment support member having a middle portion and a distal end; securing means in said middle portion to prevent said telescoping lower equipment support member from extending or collapsing during use; a U-shaped clamping device attached to each of said distal ends, said U-shaped clamping device capable of moving between opened and closed positions; and a plurality of wheels connected to said lower portion of said main support so that said piece of lawn maintenance equipment may be moved during operation in a controlled manner on said wheels by a user applying force to said handles while said upper end of said piece of lawn maintenance equipment is supported by said U-shaped upper equipment support member and attached thereto by said strap-like device, and said lower end of said piece of lawn maintenance equipment is supported by said clamping devices attached to said telescoping lower equipment support members which are fixed in position to allow said clamping devices to close around and support said lower end during use.

14. The support of claim 13 wherein said strap-like device, comprises a buckled strap.

15. The support of claim 13 further comprising a muffler guard and an exhaust deflector attached to said upper equipment support member.

16. The support of claim 13 wherein said telescoping lower equipment support member has an outer surface and said securing means comprises a plurality of holes through said outer surface, and further comprising a plurality of pins for engagement with said holes to prevent said telescoping lower equipment support member from extending or collapsing.

17. The support of claim 13 wherein said telescoping lower equipment support member has an outer surface and said securing means comprises a plurality of holes through said outer surface, and further comprising a plurality of bolts for engagement with said holes to prevent said telescoping lower equipment support member from extending or collapsing.

* * * * *